United States Patent
Miura et al.

(10) Patent No.: US 8,676,495 B2
(45) Date of Patent: Mar. 18, 2014

(54) VEHICLE NAVIGATION APPARATUS

(71) Applicant: Toyota Jidosha Kabushiki Kaisha, Toyota (JP)

(72) Inventors: Mituhiro Miura, Toyota (JP); Tomohiro Usami, Toyota (JP); Mariko Fujita, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/679,037

(22) Filed: Nov. 16, 2012

(65) Prior Publication Data
US 2013/0073143 A1      Mar. 21, 2013

Related U.S. Application Data

(63) Continuation of application No. PCT/JP2011/004970, filed on Sep. 6, 2011.

(51) Int. Cl.
    *G01C 21/34*     (2006.01)
    *G01C 21/36*     (2006.01)

(52) U.S. Cl.
    CPC ........ *G01C 21/3484* (2013.01); *G01C 21/3415* (2013.01); *G01C 21/3617* (2013.01)
    USPC .......................... 701/417; 701/411; 701/424

(58) Field of Classification Search
    USPC ............. 701/22, 23, 408, 409, 410, 411, 417, 701/424, 532
    See application file for complete search history.

(56) References Cited

U.S. PATENT DOCUMENTS

| | | | |
|---|---|---|---|
| 6,314,347 B1 | 11/2001 | Kuroda et al. | |
| 6,356,837 B1 * | 3/2002 | Yokota et al. | 701/411 |
| 6,453,235 B1 * | 9/2002 | Endo et al. | 701/428 |
| 2008/0177463 A1 | 7/2008 | Hamaguchi | |

(Continued)

FOREIGN PATENT DOCUMENTS

| | | |
|---|---|---|
| JP | 07-083678 A | 3/1995 |
| JP | 09-304084 A | 11/1997 |

(Continued)

OTHER PUBLICATIONS

English machine translation of JP 2011-047818 A.

(Continued)

*Primary Examiner* — Helal A Algahaim
*Assistant Examiner* — Dale W Hilgendorf
(74) *Attorney, Agent, or Firm* — Sughrue Mion, PLLC

(57) ABSTRACT

When a vehicle state changes from an off-road state (STEP S1) in which a current position of a vehicle is not represented in map information to an on-road state in which the current position of the vehicle is represented by the map information, a vehicle navigation apparatus records as the past arrived position an off-road position in a state changed from an on-road state to an off-road state (STEP S6), under the conditions that: the vehicle is parked in the off-road state (STEP S3); an identifier of a road at the off-road position is identical to an identifier of a road at the on-road position (STEP S4); and a traveling direction of the vehicle on the road before the off-road state is opposite to a traveling direction of the vehicle on the road after the on-road state (STEP S5).

8 Claims, 15 Drawing Sheets

(56) References Cited

U.S. PATENT DOCUMENTS

| | | | |
|---|---|---|---|
| 2009/0012664 A1* | 1/2009 | Christ | 701/22 |
| 2009/0164119 A1* | 6/2009 | Sakata | 701/209 |
| 2012/0158241 A1* | 6/2012 | Tate et al. | 701/36 |

FOREIGN PATENT DOCUMENTS

| | | |
|---|---|---|
| JP | 2000-333305 A | 11/2000 |
| JP | 2007-269275 A | 10/2007 |
| JP | 2008-175773 A | 7/2008 |
| JP | 2010-228499 A | 10/2010 |
| JP | 2010-228618 A | 10/2010 |
| JP | 2011-047818 A | 3/2011 |

OTHER PUBLICATIONS

English machine translation of JP 07-083678 A.
English machine translation of JP 2007-269275 A.
English machine translation of JP 2010-228618 A.
English machine translation of JP 09-304084 A.
English machine translation of JP 2010-228499 A.

* cited by examiner

FIG.5

| LINK ID | TRAVEL DISTANCE FROM THE NODE TO THE OFF-ROAD POSITION | TRAVEL DISTANCE FROM THE OFF-ROAD POSITION TO THE PARKING POSITION | TRAVEL TIME FROM THE OFF-ROAD POSITION TO THE PARKING POSITION |
|---|---|---|---|
| 1010 | d1 | di1 | ti1 |
| 1025 | d2 | di2 | ti2 |
| 1027 | d3 | di3 | ti3 |
| 1001 | d4 | di4 | ti4 |
| ... | ... | ... | ... |

FIG.14

| LINK ID | TRAVEL DISTANCE FROM THE NODE TO THE OFF-ROAD POSITION | TRAVEL DISTANCE FROM THE OFF-ROAD POSITION TO THE PARKING POSITION | TRAVEL TIME FROM THE OFF-ROAD POSITION TO THE PARKING POSITION | Δ SOC FROM THE OFF-ROAD POSITION TO THE PARKING POSITION | Δ SOC DURING PARKING |
|---|---|---|---|---|---|
| 1010 | d1 | di1 | ti1 | dsi1 | dss1 |
| 1025 | d2 | di2 | ti2 | dsi2 | dss2 |
| 1027 | d3 | di3 | ti3 | dsi3 | dss3 |
| 1001 | d4 | di4 | ti4 | dsi4 | dss4 |
| ... | ... | ... | ... | ... | ... |

VEHICLE NAVIGATION APPARATUS

CROSS REFERENCE TO RELATED APPLICATIONS

This application is a Continuation of International Application No. PCT/JP2011/004970, filed on Sep. 6, 2011, the contents of all of which are incorporated herein by reference in their entirety.

TECHNICAL FIELD

The present invention relates to a vehicle navigation apparatus, and more particularly to a vehicle navigation apparatus for recoding past arrived positions.

BACKGROUND ART

In general, a conventional vehicle navigation apparatus is designed to navigate from a current position to a destination set up by a user. Meanwhile, the conventional vehicle navigation apparatus has been known to be constructed to record, on a recording medium, information representing a number of times and conditions of arrival to respective past arrived positions for the purpose of setting priorities for the respective past arrived positions on the basis of the recorded information, and estimating a destination from the past arrived positions on the basis of the set priorities, even if a destination is not set (see for example Patent Document 1).

CITATION LIST

Patent Literature

{Patent Document 1}
Japanese Patent Application Publication No. 2008-175773

SUMMARY OF INVENTION

Technical Problem

However, a space for parking a vehicle such as a general parking space may not be represented by map information. In this case, the conventional vehicle navigation apparatus described above encounters such a problem that the past arrived position cannot be recorded in relation to the map information.

The present invention has been made to solve the foregoing problem, and has an object to provide a vehicle navigation apparatus that can record the past arrived position in relation to the map information, even if the past arrived position is not represented by the map information.

Solution to Problem

To achieve the above object, the vehicle navigation apparatus that records past arrived positions according to the present invention includes a map information storage unit that stores therein map information, an arrival position detection unit that detects an off-road position as the past arrived position, the off-road position being a position changed from an on-road state in which a current position of a vehicle is represented by the map information to an off-road state in which the current position of the vehicle is not represented by the map information, and an arrival position information recording unit that records arrival position information with regard to the past arrived position detected by the arrival position detection unit.

By this construction, the vehicle navigation apparatus according to the present invention is designed to record the off-road position as the past arrived position, the off-road position being the position changed from the on-road state in which the current position of the vehicle is represented by the map information to the off-road state in which the current position of the vehicle is not represented in the map information. This leads to the fact that the vehicle navigation apparatus can record the past arrived position in relation to the map information, even if the past arrived position is not represented by the map information.

The arrival position detection unit may be configured to detect the off-road position as the past arrived position under the conditions that the vehicle is parked in the off-road state, an identifier in the map information of a road including a position changed from the on-road state to the off-road state is identical to an identifier in the map information of a road including a position changed from the off-road state to the on-road state, and a traveling direction of the vehicle on the road before the off-road state is opposite to a traveling direction of the vehicle on the road after the on-road state.

By this construction, the vehicle navigation apparatus according to the present invention can detect the off-road position as the past arrived position except the off-road position of the vehicle just passing thereon.

The arrival position detection unit may be configured to detect the off-road position as the past arrived position under the conditions that the vehicle is parked in the off-road state, the identifier in the map information of the road including the position changed from the on-road state to the off-road state is not identical to the identifier in the map information of the road including the position changed from the off-road state to the on-road state, and a traveling range of the vehicle in the off-road state is within a predetermined range.

By this construction, the vehicle navigation apparatus according to the present invention can detect the off-road position as the past arrived position, even if the identifier in the map information of the road changed from off-road state to the on-road state and the identifier in the map information of the road changed from the off-road state to the on-road state are not identical to each other in such a case that a parking space having an entrance different from an exit is the arrival position.

The arrival position information includes at least the identifier in the map information of the road including the position changed from the on-road state to the off-road state, a travel distance to the off-road position on the road, and a travel distance from the off-road position to a parking position at which the vehicle is parked; and the vehicle navigation apparatus may further comprise an arrival probability calculation unit that calculates an arrival probability of the vehicle arriving at the past arrived position from the current position on the basis of the arrival position information.

In the on-road state, the arrival probability calculation unit may be configured to calculate the arrival probability by a product of a ratio of the number of having changed to the off-road state from the off-road position to the number of past traveling on the road corresponding to the current position of the vehicle, a probability factor decreasing in response to increasing distance from the current position of the vehicle to a parked position, and a probability factor increasing in response to the increasing number of past traveling on the road corresponding to the current position of the vehicle.

In the off-road state, the arrival probability calculation unit may be configured to calculate the arrival probability by a product of a probability factor decreasing in response to increasing distance from the current position of the vehicle to the parked position, and a probability factor determined in response to driving operations of the vehicle.

By this construction, the vehicle navigation apparatus according to the present invention can calculate the arrival probability of the vehicle from the current position to the past arrived position in the off-road state and on-road state.

The vehicle navigation apparatus may further includes a vehicle state control unit that controls a state of the vehicle, wherein the vehicle state control unit is configured to change a control amount of the state of the vehicle in response to the arrival probability calculated by the arrival probability calculation unit.

By this construction, the vehicle navigation apparatus according to the present invention changes the control amount of the state of the vehicle in response to the arrival probability of the vehicle arriving at the past arrived position. The vehicle navigation apparatus according to the present invention can therefore control the state of the vehicle with taking into account the case that the vehicle does not arrive at the past arrived position, thereby improving drivability and fuel efficiency in a balanced manner.

The vehicle state control unit may be configured to change a control amount of early warming up control for an internal combustion engine of the vehicle in response to the arrival probability calculated by the arrival probability calculation unit.

By this construction, the vehicle navigation apparatus according to the present invention changes the control amount of the early warming up control of the internal combustion engine in response to the arrival probability of the vehicle arriving at the past arrived position. The vehicle navigation apparatus according to the present invention can therefore perform the early warming up control of the internal combustion engine with taking into account the case that the vehicle does not arrive at the past arrived position, thereby improving drivability and fuel efficiency in a balanced manner.

The vehicle state control unit may be configured to change a preset temperature of an air conditioner to decrease its power consumption in response to the current position of the vehicle being close to the past arrived position, and further configured to change the preset temperature in response to the arrival probability calculated by the arrival probability calculation unit.

By this construction, the vehicle navigation apparatus according to the present invention changes the preset temperature of the air conditioner in response to the arrival probability of the vehicle arriving at the past arrived position. The vehicle navigation apparatus according to the present invention can therefore change the preset temperature of the air conditioner with taking into account the case that the vehicle does not arrive at the past arrived position, thereby improving drivability and fuel efficiency in a balanced manner.

The vehicle state control unit may be configured to change a remaining battery level of the vehicle in response to the arrival probability calculated by the arrival probability calculation unit.

By this construction, the vehicle navigation apparatus according to the present invention changes the remaining battery level of the vehicle in response to the arrival probability of the vehicle arriving at the past arrived position. The vehicle navigation apparatus according to the present invention can therefore change the remaining battery level of the vehicle with taking into account the case that the vehicle does not arrive at the past arrived position, thereby improving drivability and fuel efficiency in a balanced manner.

Advantageous Effects of Invention

According to the present invention, it is possible to provide a vehicle navigation apparatus that can record the past arrived position in relation to the map information, even if the past arrived position is not represented by the map information.

BRIEF DESCRIPTION OF DRAWINGS

FIG. 5 is a conceptual diagram for explaining arrival position information stored in an arrival position information storage unit constituting the vehicle navigation apparatus according to the first embodiment of the present invention.

FIG. 14 is a conceptual diagram for explaining arrival position information stored in an arrival position information storage unit constituting the vehicle navigation apparatus according to a fourth embodiment of the present invention.

DESCRIPTION OF EMBODIMENTS

The embodiments of the present invention will hereinafter be described with reference to the drawings. In the following description, a vehicle navigation apparatus according to the present invention is applied to a power split type hybrid electric vehicle, as an example. However, the vehicle navigation apparatus according to the present invention can be applied to other type hybrid electric vehicle such as a parallel type hybrid electric vehicle, a fuel cell vehicle, an electric vehicle, a gasoline engine vehicle, a diesel engine vehicle, and other type of vehicle.

First Embodiment

Figure 1:
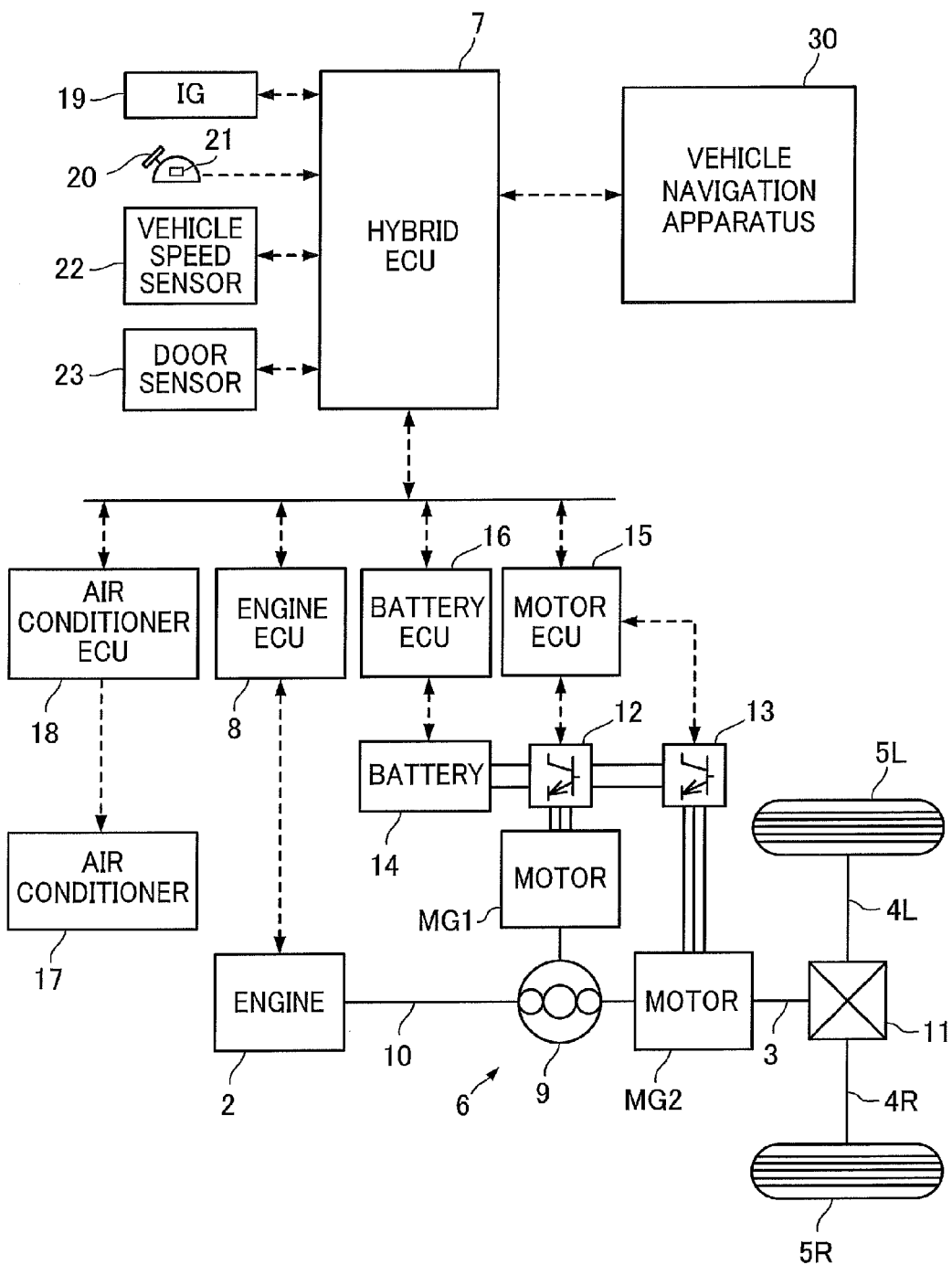
FIG. 1 is a block diagram of a vehicle having a vehicle navigation apparatus according to a first embodiment of the present invention to be mounted thereon.

As shown in FIG. 1, the hybrid electric vehicle 1 comprises an engine 2 constituting an internal combustion engine, a power transmission device 6 that transmits power generated by the engine 2 to drive wheels 5L, 5R via a propeller drive shaft 3 and drive shafts 4L, 4R, a hybrid electronic control unit (hereinafter simply referred to as a "hybrid ECU") 7 that controls parts of the hybrid electric vehicle 1, and an engine electronic control unit (hereinafter simply referred to as an "engine ECU") 8 that controls the engine 2.

The engine ECU 8 is constituted by a microprocessor having a CPU (Central Processing Unit), a ROM (Read Only Memory), a RAM (Random Access Memory), a flash memory, and an input/output port.

The ROM of the engine ECU 8 is stored therein programs to have the microprocessor function as the engine ECU 8. In other words, the microprocessor functions as the engine ECU 8 by the CPU of the engine ECU 8 executing the programs stored in the ROM with using the RAM as a work area.

The engine ECU 8 is configured to communicate with the hybrid ECU 7 via an in-vehicle network such as, for example, a high speed CAN (controller area network). The engine ECU 8 is configured to perform operation controls of the engine 2 such as, for example, a fuel injection control, an ignition control, and an intake air volume control on the basis of control signals inputted from the hybrid ECU7, detection signals inputted respectively from various sensors adapted to detect various operating conditions of the engine 2, and so on, and configured to output data relevant to the operating conditions of the engine 2 to the hybrid ECU 7 as needed basis.

The power transmission device 6 comprises motor-generators MG1, MG2, and a power split mechanism 9 constructed to split the power generated by the engine 2 into power transmitted to the drive wheels 5L, 5R and power to drive the motor generator MG1.

The power split mechanism 9 is connected with an edge portion of a crank shaft 10 as an output shaft of the engine 2. The power split mechanism 9 is constituted by a planetary gear mechanism adapted to split the power generated by the engine 2 and adapted to integrate the powers transmitted from the motor generator MG1 and the drive wheels 5L, 5R.

Accordingly, the power split mechanism 9 is adapted to have the motor generator MG1 function as an electrical generator by one split power and to have the drive wheels 5L, 5R rotate by the other split power.

The power split mechanism 9 is adapted to integrate the power inputted from the motor generator MG1 and the power inputted from the engine 2 under the conditions that the motor generator MG1 functions as the electrical generator and the engine 2 drives.

The power split mechanism 9 is adapted to rotate the crank shaft 10 to have the engine 2 start driving by the power inputted from the motor generator MG1 under the conditions that the motor generator functions as the electrical generator and the engine 2 stops.

The power outputted from the power transmission device 6 is transmitted to a differential gear 11. The differential gear 11 is connected with the drive shafts 4L, 4R to transmit the power to the drive wheels 5L, 5R via the drive shafts 4L, 4R.

The motor generator MG2 supplied with driving power is operative to function as a driving source. The power generated by the motor generator MG2 is transmitted to the drive wheels 5L, 5R.

The motor-generator MG2 not supplied with driving power is operative to decelerate rotation of the drive wheels 5L, 5R, and to function as an electric power regeneration device converting the decelerated rotation power into electrical power.

The motor-generators MG1, MG2 are adapted to exchange the electrical power with a battery 14 via respective inverters 12, 13.

The hybrid electric vehicle 1 further comprises a motor electronic control unit (hereinafter simply referred to as a "motor ECU") 15 to drive and control the foregoing motor generators MG1, MG2.

The motor ECU 15 is constituted by a microprocessor having a CPU, a ROM, a RAM, a flash memory, and an input/output port. The ROM of the motor ECU 15 is stored therein programs to have the microprocessor function as motor ECU 15.

In other words, the microprocessor functions as the motor ECU 15 by the CPU of the motor ECU 15 executing the program stored in the ROM with using the RAM as a work area.

The motor ECU 15 is configured to drive and control the motor generators MG1, MG2 by outputting switching control signals to the inverters 12, 13.

The motor ECU 15 is configured to communicate with the hybrid ECU 7 via the high speed CAN, and to drive and control the motor generators MG1, MG2 by controlling the inverters 12, 13, respectively, in response to the control signals inputted from the hybrid ECU 7. The motor ECU 15 is further configured to output data relevant to the driving conditions of the motor generators MG1, MG2 to the hybrid ECU 7 as needed basis.

The hybrid electric vehicle 1 further comprises a battery electronic control unit (hereinafter simply referred to as a "battery ECU") 16. The battery ECU 16 is constituted by a microprocessor having a CPU, a ROM, a RAM, a flash memory, and an input/output port.

The ROM of the battery ECU 16 is stored therein programs to have the microprocessor function as the battery ECU 16. In other words, the microprocessor functions as the battery ECU 16 by the CPU of the battery ECU 16 executing the programs stored in the ROM with using the RAM as a work area.

The battery ECU 16 is adapted to be inputted therein with signals needed for regulating the conditions of the battery 14, for example, signals respectively representing a terminal voltage between terminals of the battery 14, a discharge and charge current of the battery 14, a temperature of the battery 14, and so on.

The battery ECU 16 is configured to output data relevant to the conditions of the battery 14 to the hybrid ECU 7 as needed basis. For example, the battery ECU 16 is configured to calculate a SOC (State Of Charge) indicating a remaining level of the battery 14 on the basis of an integrated value of the discharge and charge current of the battery 14, and to output the calculated SOC to the hybrid ECU 7.

The hybrid electric vehicle 1 further comprises an air conditioner electronic control unit (hereinafter simply referred to as an "air conditioner ECU") 18 to control an air conditioner 17 for regulating a temperature inside a vehicle.

The air conditioner ECU 18 is constituted by a microprocessor having a CPU, a ROM, a RAM, a flash memory, and an input/output port. The ROM of the air conditioner ECU 18 is stored therein programs to have the microprocessor function as the air conditioner ECU 18. In other words, the microprocessor functions as the air conditioner ECU 18 by the CPU of the air conditioner ECU 18 executing the programs stored in the ROM with using the RAM as a work area.

The air conditioner ECU 18 is configured to be inputted therein a signal indicating the temperature inside the vehicle. The air conditioner ECU 18 is, for example, configured to control the air conditioner 17 for regulating the temperature inside the vehicle to a temperature set via hybrid ECU 7.

The hybrid ECU 7 is constituted by a microprocessor having a CPU, a ROM, a RAM, a flash memory, and an input/output port. The ROM of the air conditioner ECU 18 is stored therein programs to have the microprocessor function as the hybrid ECU 7. In other words, the microprocessor functions as the hybrid ECU 7 by the CPU of the hybrid ECU 7 executing the programs stored in the ROM with using the RAM as a work area.

The hybrid ECU 7 is configured to be inputted therein via the input port an ignition signal from an ignition switch (hereinafter simply referred to as an "IG") 19, a shift position signal from a shift position sensor 21 that detects a shift position of a shift lever 20 manually handled by a driver, a vehicle speed signal from a vehicle speed sensor 22, a door opening/closing signal from a door sensor 23 that detects a door opening/closing state, and other signals.

The hybrid ECU 7 is connected with the engine ECU 8, the motor ECU 15, the battery ECU 16, and the air conditioner ECU 18 each other via the high speed CAN to communicate a variety of control signals and data with the engine ECU 8, the motor ECU 15, the battery ECU 16 and the air conditioner ECU 18.

The hybrid ECU 7 is, for example, configured to create a control signal indicating whether or not to charge the battery 14 with the electrical power generated by the motor generators MG1, MG2 on the basis of the SOC indicated by data transmitted from the battery ECU 16, and to transmit the control signal to the motor ECU 15.

According to the present embodiment, the hybrid ECU 7 is connected with a vehicle navigation apparatus 30. The vehicle navigation apparatus 30 is configured to transmit control signals for controlling various parts of the hybrid electric vehicle 1 via the hybrid ECU 7, and to receive status signals for obtaining the states of the various parts of the hybrid electric vehicle 1 via the hybrid ECU 7.

The vehicle navigation apparatus 30 may be connected with the other ECU such as the engine ECU 8, the motor ECU 15, the battery ECU 16 or the air conditioner ECU 18, or may be connected with a bus constituting the high speed CAN.

Figure 2:
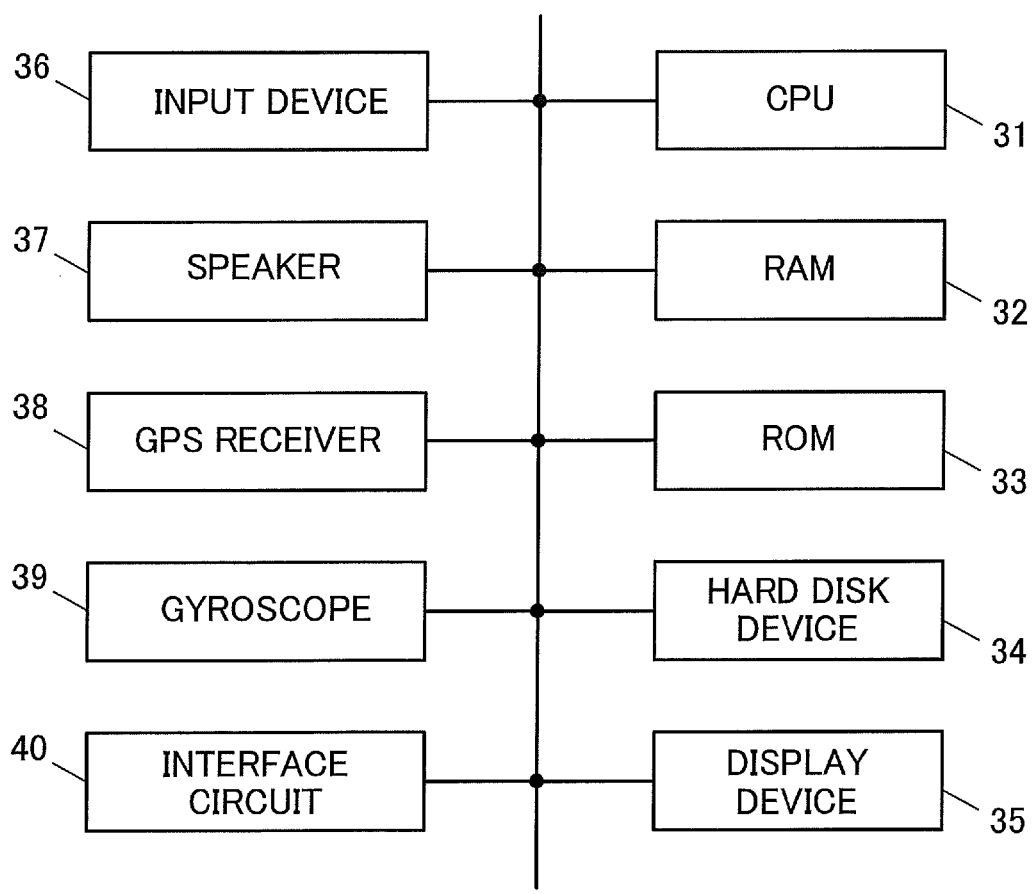
FIG. 2 is a block diagram of a hardware construction of the vehicle navigation apparatus according to the first embodiment of the present invention.

As shown in FIG. 2, the vehicle navigation apparatus 30 comprises a CPU 31, a RAM 32, a ROM 33, a hard disk device 34, and a display device 35 constituted by a liquid crystal display, a plasma display, or the like.

The vehicle navigation apparatus 30 further comprises a touch panel integrally provided with the display device 35, an input device 36 constituted by such as a receiving circuit for a remote controller and a control panel, a speaker 37, a GPS (Global Positioning System) receiver 38 that measures longitude and latitude of a current location, a gyroscope 39 adapted to detect a traveling direction of the hybrid electric vehicle 1, and an interface circuit 40 arranged to communicate with the hybrid ECU 7.

The ROM 33 and the hard disk device 34 are stored therein programs to have the vehicle navigation apparatus 30 function. In other words, the vehicle navigation apparatus 30 functions by the CPU 31 executing the programs stored in the ROM 33 with using the RAM 32 as a work area.

As with the common vehicle navigation apparatus, the vehicle navigation apparatus 30 is, for example, operable to navigate a route from the current location to a destination inputted via the input device 36, and to store past traveling history in the hard disk device 34.

Figure 3:
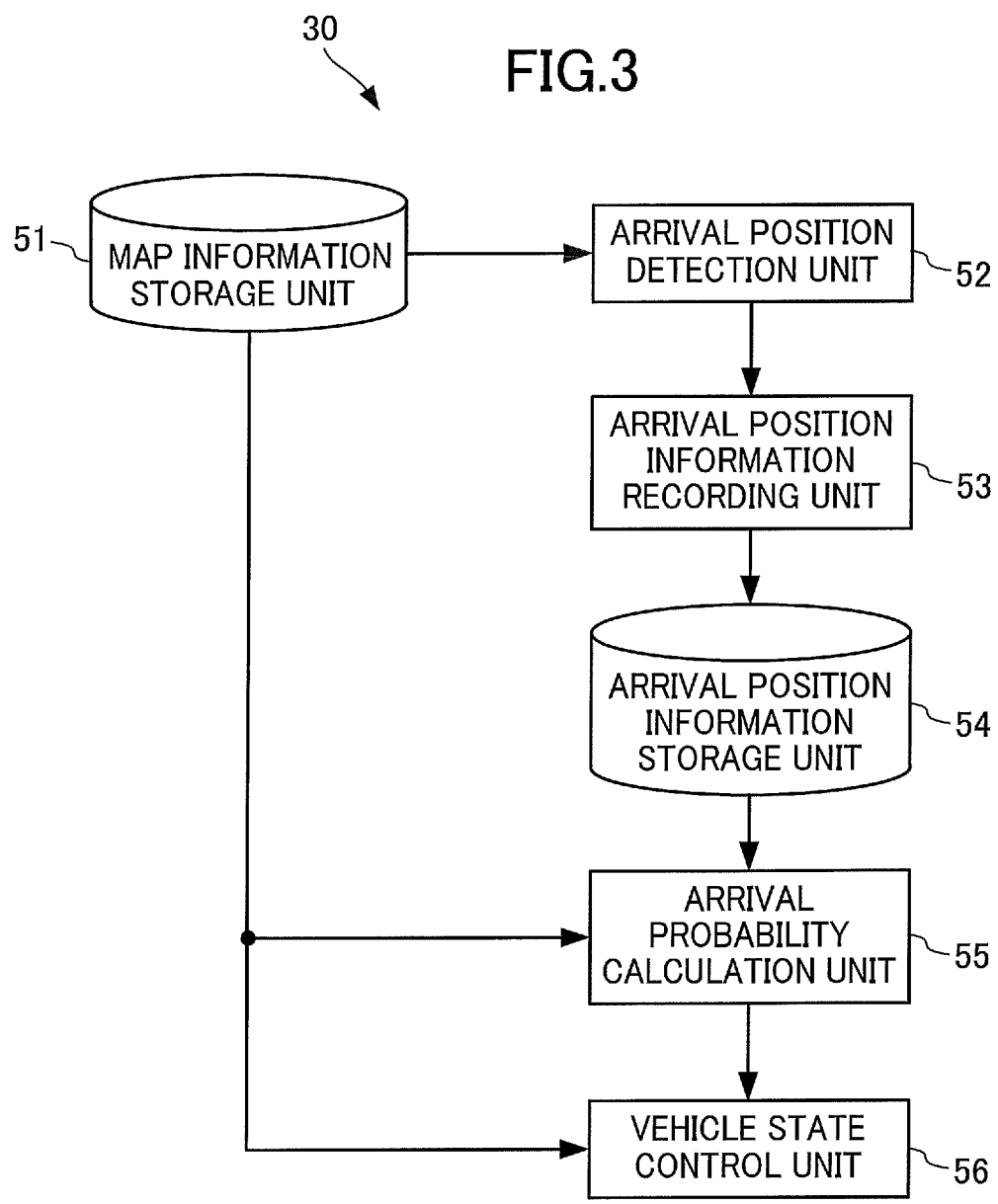
FIG. 3 is a block diagram of a functional construction of the vehicle navigation apparatus according to the first embodiment of the present invention.

As shown in FIG. 3, the vehicle navigation apparatus 30 comprises a map information storage unit 51 that stores therein map information including road information indicating roads, an arrival position detection unit 52 that detects an arrival position, an arrival position information recording unit 53 that records arrival position information with regard to the detected arrival position, an arrival position information storage unit 54 that stores therein the arrival position information, an arrival probability calculation unit 55 that calculates an arrival probability of the hybrid electric vehicle 1 arriving at a past arrived position from a current position, and a vehicle state control unit 56 that controls a state of the hybrid electric vehicle 1.

The map information storage unit 51 is constituted by the hard disk device 34. The map information includes feature information. The feature information includes information indicating features such as roads, intersections, building structures, and rivers. The feature information further includes information indicating a name, an explanation, and the like relevant to each feature. In particular, the feature information includes road information relevant to the roads.

The road information includes a link ID, i.e., an identifier for identifying each road, a node ID for identifying a node connected by the roads, information relevant to a structure of each road, and information relevant to traffic regulations of each road. The structure of each road includes the number of traffic lanes, a gradient, and the like. The traffic regulations of each road include a speed limit, a one-way regulation, and the like.

Each road is assigned thereto interpolation points for reproducing its shape. The vehicle navigation apparatus 30 is adapted to treat the interpolation points as the nodes. In addition, the vehicle navigation apparatus 30 is adapted to treat as the link ID, an ID in combination of the general link ID for identifying each road and a sequence of the interpolation points of the road.

In the following description, the state that the current position of the hybrid electric vehicle 1 is represented by the map information is referred to as an on-road state, and the state that the current position of the hybrid electric vehicle 1 is not represented by the map information is referred to as an off-road state. In addition, a position in a state changed from the on-road state to the off-road state is referred to as an off-road position, and a position in a state changed from the off-road state to the on-road state is referred to as an on-road position.

The arrival position detection unit 52 is configured to detect the off-road position as the past arrived position. The arrival position detection unit 52 will hereinafter be described in detail.

The arrival position detection unit 52 is constituted by the CPU 31, the GPS receiver 38, the gyroscope 39, and the interface circuit 40. The arrival position detection unit 52 is designed to obtain the longitude and latitude of the position of the hybrid electric vehicle 1 by the GPS receiver 38.

The arrival position detection unit 52 is designed to correct and interpolate the longitude and latitude of the position of the hybrid electric vehicle 1 obtained from the GPS receiver 38 on the basis of the traveling direction detected by the gyroscope 39 and the vehicle speed indicated by the vehicle speed signal obtained from the vehicle speed sensor 22 via the interface circuit 40.

The arrival position detection unit 52 is designed to determine whether or not the hybrid electric vehicle 1 is in the off-road state on the basis of the map information and the longitude and latitude of the position of the hybrid electric vehicle 1. In addition, the arrival position detection unit 52 is designed to determine whether or not the hybrid electric vehicle 1 is parked, by determining whether or not the hybrid electric vehicle 1 meets a parking condition in a manner as described hereinafter.

For example, the arrival position detection unit 52 is configured to determine that the hybrid electric vehicle 1 meets the parking condition in case that the shift position signal obtained from the shift position sensor 21 via the interface circuit 40 indicates a parking position.

The arrival position detection unit 52 is configured to determine that the hybrid electric vehicle 1 meets the parking condition in case that the detection signals representing the operating conditions of the engine 2 obtained from the engine ECU 8 via the interface circuit 40 indicates a stop of the engine 2.

The arrival position detection unit 52 is configured to determine that the hybrid electric vehicle 1 meets the parking condition in case that the vehicle speed represented by the vehicle speed signal obtained from the vehicle speed sensor 22 via the interface circuit 40 continues to be 0 for more than or equal to a predetermined time period.

The arrival position detection unit 52 is configured to determine that the hybrid electric vehicle 1 meets the parking condition in case that the door opening/closing signal obtained from the door sensor 23 via the interface circuit 40 indicates an open of the door.

The arrival position detection unit 52 may determine that the hybrid electric vehicle 1 is parked, if any one of the parking conditions above mentioned is met. The arrival position detection unit 52 may also determine that the hybrid electric vehicle 1 is parked, if a predetermined combination of the parking conditions above mentioned is met.

Figure 4:
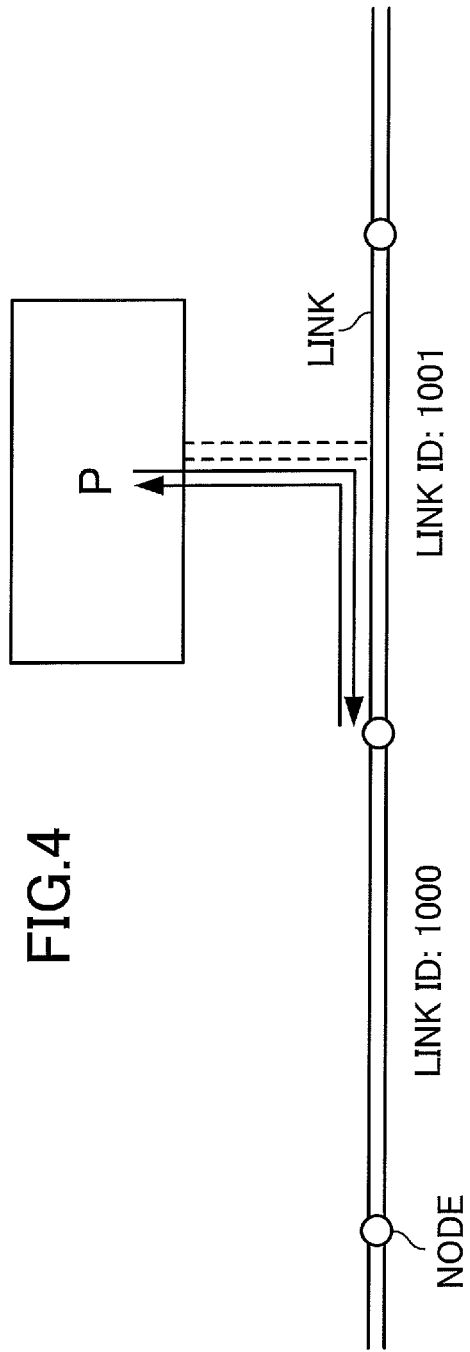
FIG. 4 is a conceptual diagram for explaining a detecting condition of an arrival position of an arrival position detector constituting the vehicle navigation apparatus according to the first embodiment of the present invention.

As shown in FIG. 4, the arrival position detection unit 52 is configured to detect the off-road position as the past arrived position under the conditions that the vehicle is parked in the off-road state, the link ID in the map information of the road including the position changed from the on-road state to the off-road state is identical to the link ID in the map information of the road including the position changed from the off-road state to the on-road state, and a traveling direction of the hybrid electric vehicle 1 on the road before the off-road state is opposite to a traveling direction of the hybrid electric vehicle 1 on the road after the on-road state.

In other words, the arrival position detection unit 52 is configured to detect the off-road position as the past arrived position under the conditions that the vehicle is parked in the off-road state, the link IDs of the roads respectively including the on-road position and off-road position are identical to each other, and the traveling directions of the hybrid electric vehicle 1 on the roads respectively before off-road and after on-road are opposite to each other.

In FIG. 3, the arrival position information recording unit 53 is constituted by the CPU 31, and configured to record arrival position information with regard to the arrival position detected by the arrival position detection unit 52 in the arrival position information storage unit 54. In the present embodiment, the arrival position information storage unit 54 is constituted by the hard disk device 34.

As shown in FIG. 5, the arrival position information represents, with respect to each link ID, a travel distance from the node to the off-road position, a travel distance from the off-road position to a parking position, and a travel time from the off-road position to the parking position.

In FIG. 3, the arrival probability calculation unit 55 is constituted by the CPU 31, and configured to calculate an arrival probability P of the hybrid electric vehicle 1 arriving at the past arrived position from the current position on the basis of the arrival position information stored in the arrival position information storage unit 54.

The arrival probability calculation unit 55 is configured to calculate, in the on-road state, the arrival probability P of the hybrid electric vehicle 1 arriving at the past arrived position from the current position by a product of a ratio R of the number of having changed to the off-road state from the off-road position to the number of past traveling on the road corresponding to the current position of the hybrid electric vehicle 1, a probability factor f1 decreasing in response to increasing distance from the current position of the hybrid electric vehicle 1 to the parked position, and a probability factor f2 increasing in response to the increasing number of past traveling on the road corresponding to the current position of the hybrid electric vehicle 1.

Figure 6:
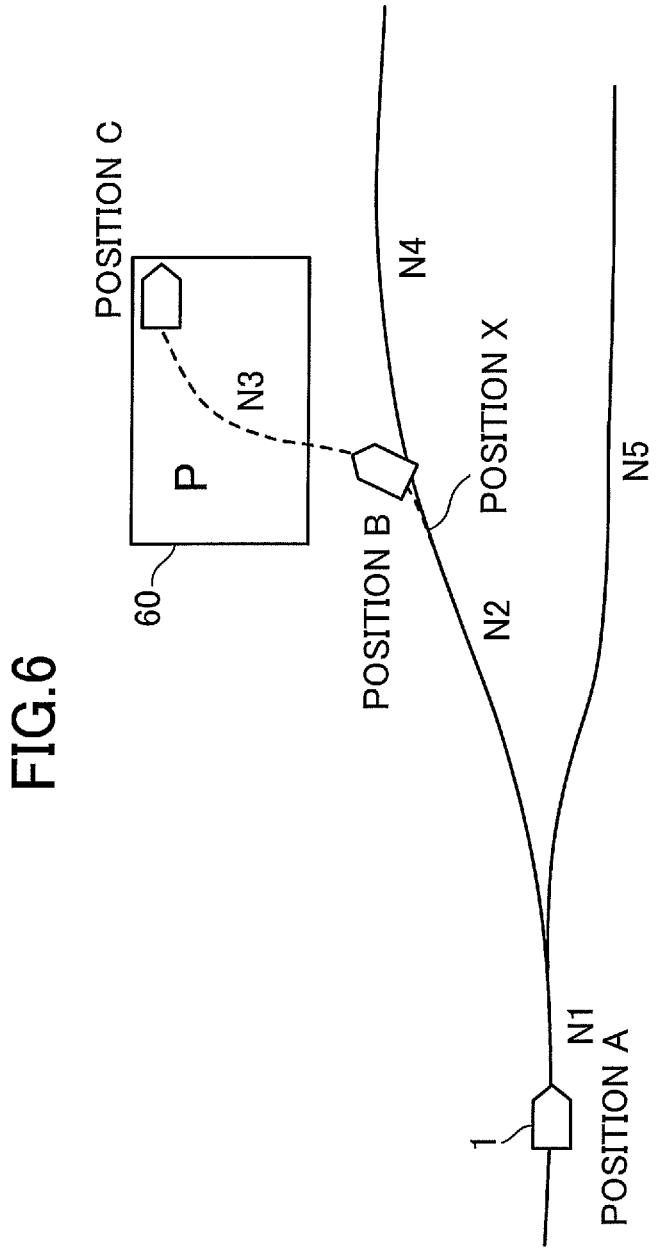
FIG. 6 is a conceptual diagram for explaining an example of calculating arrival probability by an arrival probability calculation unit constituting the vehicle navigation apparatus according to the first embodiment of the present invention.

As shown in FIG. 6, for example, if the number of past traveling on the road corresponding to the current position A of the hybrid electric vehicle 1 is assumed to be N1 and the number of having changed to the off-road state from the off-road position X is assumed to be N3, the above mentioned ratio R will be N3/N1.

The arrival probability calculation unit 55 can obtain the number of traveling N1 from the past traveling history stored in the hard disk device 34, and obtain the number of having become changed to the off-road state N3 from the arrival position information shown in FIG. 5.

Additionally, when the hybrid electric vehicle 1 becomes the off-road state from the current position A via the off-road position X, a distance from the current position A to the previously parked position C of the hybrid electric vehicle 1 is assumed to be L. The arrival probability calculation unit 55 is configured to obtain the distance L by calculating a sum of distances including a distance from the current position A to a node near side of the off-road position X which is obtained from the map information, and a travel distance from the near side node to the off-road position X and a travel distance from the off-road position X to the parking position which are obtained from the arrival position information shown in FIG. 5.

Figure 7:
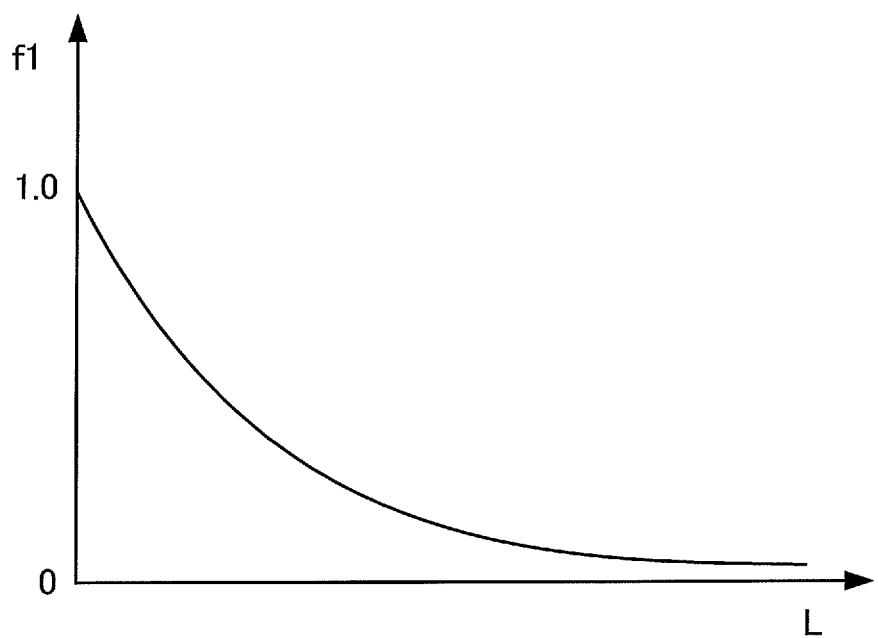
FIG. 7 is a conceptual diagram of a map of a first probability factor referenced by the arrival probability calculation unit constituting the vehicle navigation apparatus according to the first embodiment of the present invention.

As shown in FIG. 7, the probability factor f1 has a range between 0 and 1, and decreases in response to the increasing distance L. The probability factor f1 is represented by a map preliminarily stored in the ROM 33 or the hard disk device 34.

Figure 8:
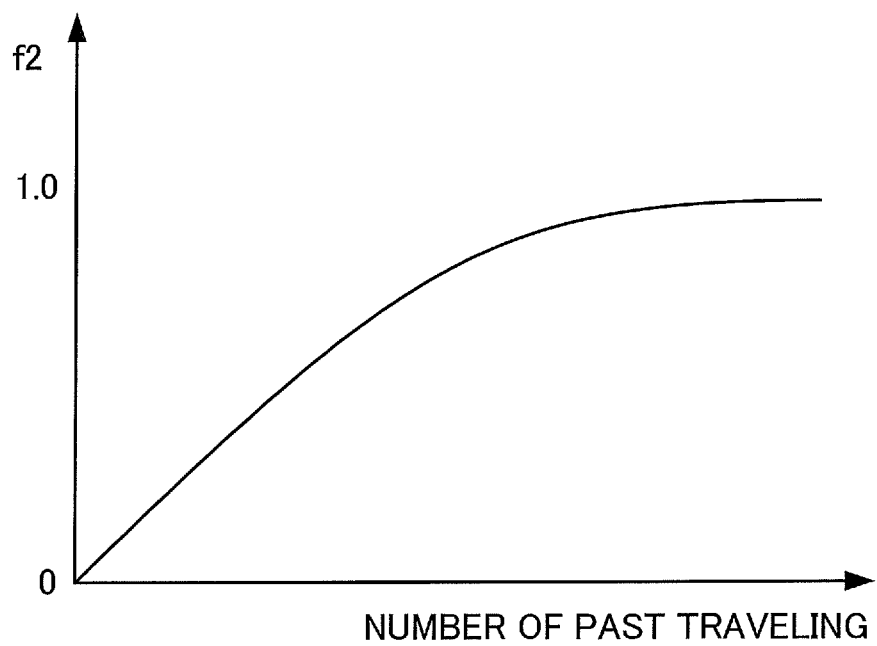
FIG. 8 is a conceptual diagram of a map of a second probability factor referenced by the arrival probability calculation unit constituting the vehicle navigation apparatus according to the first embodiment of the present invention.

As shown in FIG. 8, the probability factor f2 has a range between 0 and 1, and increases in response to the increasing number of past traveling of the hybrid electric vehicle 1. The probability factor f2 is represented by a map preliminarily stored in the ROM 33 or the hard disk device 34.

In accordance with the above description, if the current position of the hybrid electric vehicle 1 is the position A, the arrival probability calculation unit 55 is configured to calculate the probability of the hybrid electric vehicle 1 parked at a parking space 60. The probability, i.e., the arrival probability P of the hybrid electric vehicle 1 arriving at the past arrived position is calculated according to a following formula.

$$P = N3/N1 \times f1(L) \times f2(N1)$$

The arrival probability calculation unit 55 is configured to calculate, in the off-road state, the arrival probability P of the hybrid electric vehicle 1 arriving at the past arrived position by a product of the above mentioned probability factor f1 and a probability factor f3 determined in accordance with operations made to the hybrid electric vehicle 1.

As shown in FIG. 6, for example, the current position of the hybrid electric vehicle 1 is assumed to be the position B, and when the hybrid electric vehicle 1 becomes in the off-road state from the off-road position X, a distance from the current position B to the previously parked position C of the hybrid electric vehicle 1 is assumed to be L.

In this case, the arrival probability calculation unit 55 is configured to calculate the distance L by subtracting a travel distance from the off-road position X to the position B from a travel distance from the off-road position X to the parking position on the basis of the arrival position information shown in FIG. 5.

The probability factor f3 is a predetermined value between 0 and 1. The predetermined value is related to the operations h to park the hybrid electric vehicle 1. The relationships between the operations h and the predetermined values are represented by relationship information preliminarily stored in the ROM 33 or the hard disk device 34.

For example, the probability factor f3 will be 1 in the case that the shift position signal obtained from the shift position sensor 21 via the interface circuit 40 indicates a reverse position. In accordance with the above description, in the case that current position of the hybrid electric vehicle 1 is the position B, the arrival probability calculation unit 55 is configured to calculate the arrival probability P of the hybrid electric vehicle 1 parking at the parking space 60 according to a following formula.

$$P = f1(L) \times f3(h)$$

If the arrival position information are redundantly registered for the same link ID of the road including the off-road position, the arrival probability calculation unit 55 is configured to calculate the arrival probability P after averaging each value such as, in the present embodiment, the travel distance from the node to the off-road position, the travel distance from the off-road position to the parking position, and the travel time from the off-road position to the parking position.

The vehicle state control unit 56 is constituted by the CPU 31, and configured to control the state of the hybrid electric vehicle 1 by a control amount in response to the arrival probability P calculated by the arrival probability calculation unit 55.

In the present embodiment, the engine ECU 8 is configured to perform an early warming up control to increase a temperature of the engine 2 by at least one of controlling revolution speed of the engine 2 to increase and controlling ignition timing of the engine 2 to delay.

The vehicle state control unit 56 is configured to control the engine ECU 8 via interface circuit 40 to change the increased revolution speed and the delayed ignition timing of the engine 2 as the control amount of the early warming up control.

Figure 9:
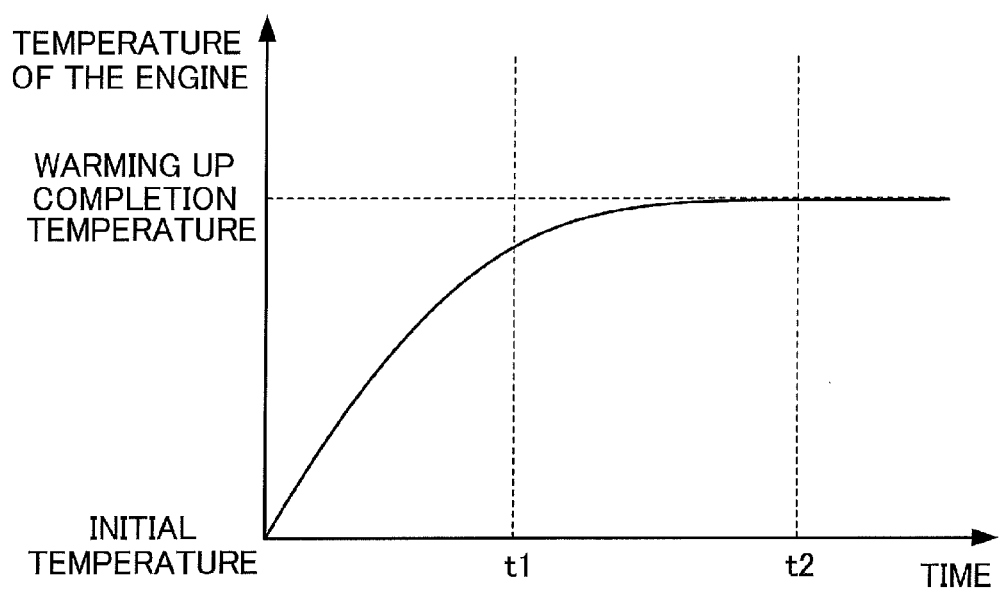
FIG. 9 is a conceptual diagram of a graph referenced by a vehicle state control unit constituting the vehicle navigation apparatus according to the first embodiment of the present invention.

As shown in FIG. 9, a general relationship between the temperature of the engine 2 and time can be represented by heat capacity, thermal resistance of the engine, and predicted heat quantity consumed for a warm-up. The predicted heat quantity may be a predetermined constant, a predetermined constant in response to initial temperature, or a value learned during past travels.

The vehicle state control unit 56 is configured to determine on the basis of the graph shown in FIG. 9 whether or not the warm-up is completed by a predicted time T at which the hybrid electric vehicle 1 is predicted to arrive at the parking position. In other words, the vehicle state control unit 56 is configured to determine that heat caused by the warming up control is wasted in the case the predicted time T=t1, by the reason that the warm-up is not completed by the predicted time T, and to determine that heat caused by the warming up control is not wasted in the case the predicted time T=t2, by the reason that the warm-up is completed by the predicted time T.

The predicted time T may be substituted by a time subtracted a predetermined time from the predicted time at which the hybrid electric vehicle 1 is predicted to arrive at the parking position in place of the predicted time at which the hybrid electric vehicle 1 is predicted to arrive at the parking position.

It is assumed that the increased amount of the revolution speed of the engine 2 for the early warming up is ΔNem, and the delayed amount of the ignition timing of the engine 2 for the early warming up is ΔDm. In this case, when the vehicle state control unit 56 determines that the warming up is predicted to be completed in the given time, the vehicle state control unit 56 is configured to control the engine ECU 8 to make the increased amount of the revolution speed ΔNe of the engine 2 for the warming up become ΔNem, and make the delayed amount of the ignition timing ΔD of the engine 2 for the warming up become ΔDm.

When the vehicle state control unit 56 determines that the warming up is predicted not to be completed in the given time, the vehicle state control unit 56 is configured to control the engine ECU 8 to calculate the increased amount of the revolution speed ΔNe of the engine 2 for the warming up and the delayed amount of the ignition timing ΔD of the engine 2 for the warming up according to following formulae.

$$\Delta Ne = \Delta Nem \times (1-P)$$

$$\Delta D = \Delta Dm \times (1-P)$$

In the present embodiment, the arrival position information stored in the arrival position information storage unit 54 is explained as representing information with regard to the single arrival position for better understanding for the present invention. However, the general arrival position information stored in the arrival position information storage unit 54 represents information with regard to a plurality of arrival positions.

Accordingly, while the IG 19 is ON, the arrival probability calculation unit 55 is configured to calculate an arrival probability P of the hybrid electric vehicle 1 to arrive at each arrival position represented in the arrival position information, and the vehicle state control unit 56 is configured to calculate the control amount in response to the respectively calculated arrival probabilities P, and to average the calculated control amounts to control the state of the hybrid electric vehicle 1 by the averaged control amount.

Figure 10:
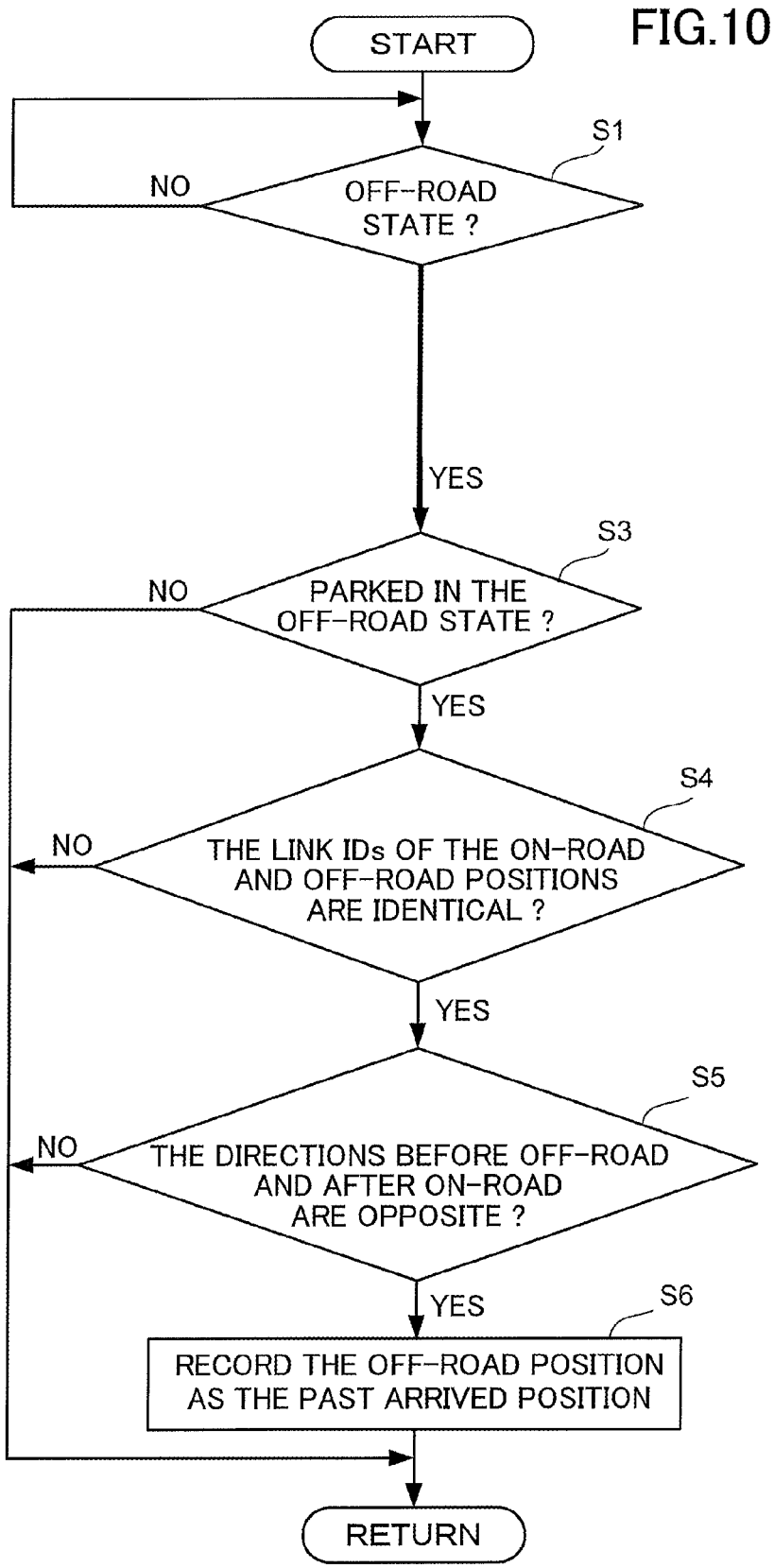
FIG. 10 is a flow chart of an arrival position information recording operation of the vehicle navigation apparatus according to the first embodiment of the present invention.

The arrival position recording operation of the vehicle navigation apparatus 30 constructed as mentioned above will be described hereinafter with reference to the flow chart shown in FIG. 10. The arrival position recording operation described below is repeatedly executed while the IG 19 is ON.

If the fact that the hybrid electric vehicle 1 has been changed to the off-road state is detected by the arrival position detection unit 52 (Step S1), then the determination is made by the arrival position detection unit 52 whether or not the hybrid electric vehicle 1 is parked in the off-road state (Step S3).

When the determination is made that the hybrid electric vehicle 1 is not parked in the off-road state, the arrival position recording operation is ended. On the other hand, when the determination is made that the hybrid electric vehicle 1 is parked in the off-road state, the determination is made by the arrival position detection unit 52 whether or not the link IDs of the roads respectively including the on-road position and off-road position are identical to each other (Step S4).

When the determination is made that the link IDs of the roads respectively including the on-road position and off-road position are not identical to each other, the arrival position recording operation is ended. On the other hand, when the determination is made that the link IDs of the roads respectively including the on-road position and off-road position are identical to each other, the determination is made by the arrival position detection unit 52 whether or not the traveling direction of the hybrid electric vehicle 1 on the road before the off-road state is opposite to the traveling direction of the hybrid electric vehicle 1 on the road after the on-road state (Step S5).

When the determination is made that the traveling direction of the hybrid electric vehicle 1 on the road before the off-road state is not opposite to the traveling direction of the hybrid electric vehicle 1 on the road after the on-road state, the arrival position recording operation is ended. On the other hand, when the determination is made that the traveling direction of the hybrid electric vehicle 1 on the road before the off-road state is opposite to the traveling direction of the hybrid electric vehicle 1 on the road after the on-road state, the off-road position is recorded as a past arrived position (Step S6). In other words, the arrival position information having the link ID of the off-road position as an index thereof is stored in the arrival position information storage unit 54.

The arrival probability P of the hybrid electric vehicle 1 arriving at the past arrived position from the current position is, as described above, calculated on the basis of the arrival position information stored in the arrival position information storage unit 54 by the arrival probability calculating unit 55, and the increased amount of the revolution speed and the delayed amount of the ignition timing of the engine 2 in the early warming up control are changed in response to the calculated arrival probability P.

As will be understood from the foregoing description, the vehicle navigation apparatus 30 according to the present embodiment can record as a past arrived position the off-road position changed from the on-road state in which the current position of the hybrid electric vehicle 1 is represented by the map information to the off-road state in which the current position of the hybrid electric vehicle 1 is not represented by the map information. This leads to the fact that the vehicle navigation apparatus 30 can record the past arrived position in relation to the map information, even if the past arrived position is not represented by the map information.

In addition, the vehicle navigation apparatus 30 according to the present embodiment is designed to change the control amount of the early warming up control of the engine 2 in response to the arrival probability P of the hybrid electric vehicle 1 arriving at the past arrived position. The vehicle navigation apparatus 30 according to the present embodiment can therefore perform the early warming up control to the hybrid electric vehicle 1 with taking into account the case that the hybrid electric vehicle 1 does not arrive at the past arrived position, thereby improving drivability and fuel efficiency in a balanced manner.

Second Embodiment

The vehicle navigation apparatus according to the present embodiment is realized by changing the program executed by the CPU 31 of the vehicle navigation apparatus 30 according to the first embodiment of the present invention.

In the first embodiment of the present invention, the arrival position detection unit 52 is explained as detecting an off-road position as the past arrived position, under the conditions that the vehicle is parked in the off-road state, the link IDs of the roads respectively including the on-road position and off-road position are identical to each other, and the traveling directions of the hybrid electric vehicle 1 on the roads respectively before off-road and after on-road are opposite to each other.

Figure 11:
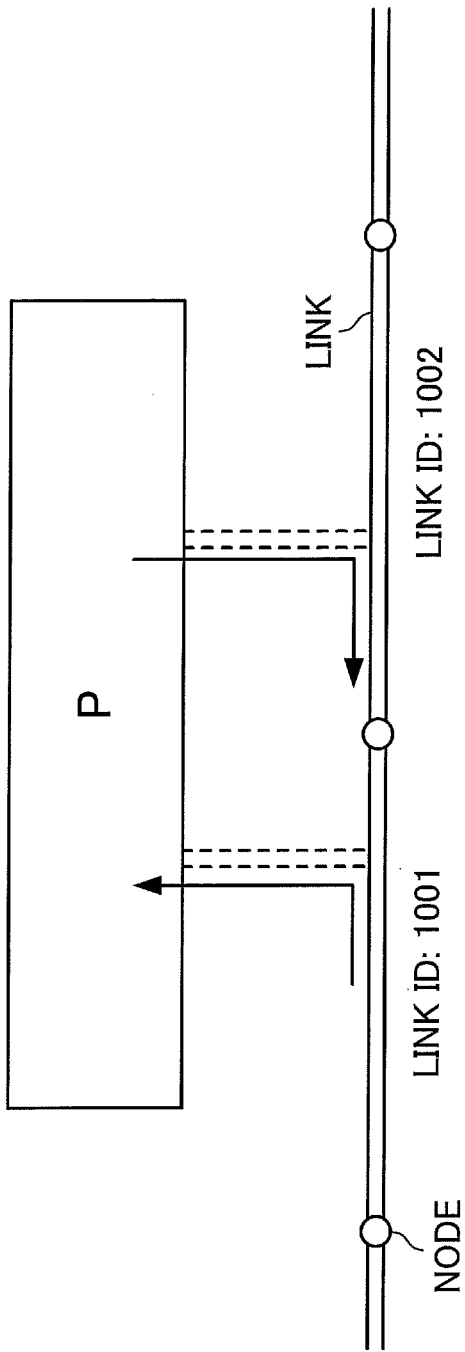
FIG. 11 is a conceptual diagram for explaining a detecting condition of an arrival position by an arrival position detection unit constituting the vehicle navigation apparatus according to a second embodiment of the present invention.

In the present embodiment as shown in FIG. 11, the arrival position detection unit 52 is further adapted to meet a parking space having an entrance and an exit different from each other, for example. In this reason, the arrival position detection unit 52 is further configured to detect the off-road position as the past arrived position, under the conditions that the hybrid electric vehicle 1 is parked in the off-road state, the link IDs of the roads respectively including the on-road position and off-road position are not identical to each other, and a traveling range of the hybrid electric vehicle 1 in the off-road state is within a predetermined range.

In other words, the arrival position detection unit 52 is configured to detect the off-road position as the past arrived position if either conditions including first conditions or second conditions are established. The first conditions are that the vehicle is parked in the off-road state, the link IDs of the roads respectively including the on-road position and off-road position are identical to each other, and the traveling directions of the hybrid electric vehicle 1 on the roads respectively before off-road and after on-road are opposite to each other. The second conditions are that the hybrid electric vehicle 1 is parked in the off-road state, the link IDs of the roads respectively including the on-road position and off-road position are not identical to each other, and a traveling range of the hybrid electric vehicle 1 in the off-road state is within a predetermined range.

Figure 12:
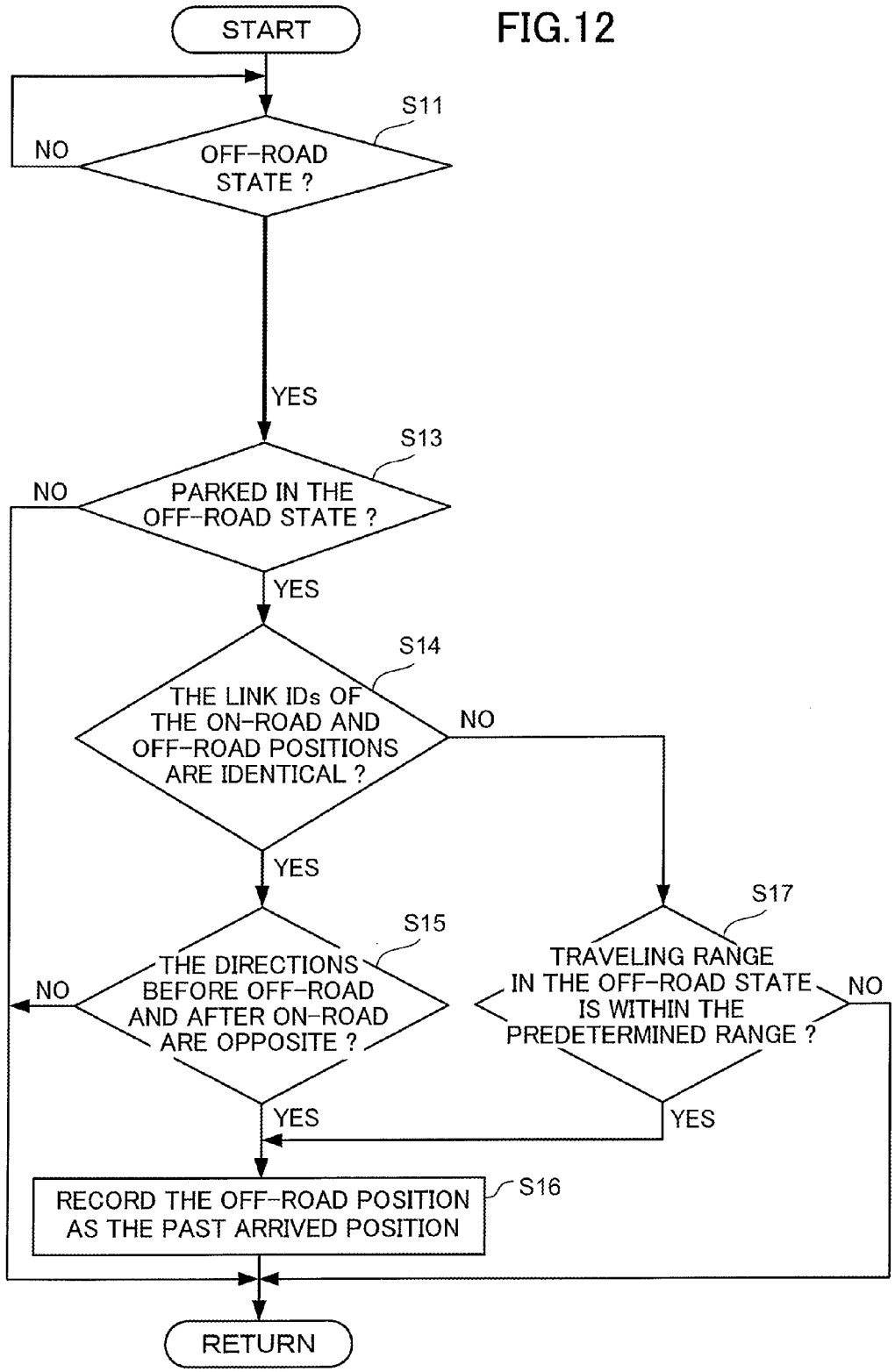
FIG. 12 is a flow chart of an arrival position information recording operation of the vehicle navigation apparatus according to the second embodiment of the present invention.

The arrival position recording operation of the vehicle navigation apparatus 30 constructed as mentioned above will be described hereinafter with reference to the flow chart shown in FIG. 12. The arrival position recording operation described below is repeatedly executed while the IG 19 is ON.

If the fact that the hybrid electric vehicle 1 has been changed to the off-road state is detected by the arrival position detection unit 52 (Step S11), then the determination is made by the arrival position detection unit 52 whether or not the hybrid electric vehicle 1 is parked in the off-road state (Step S13).

When the determination is made that the hybrid electric vehicle 1 is not parked in the off-road state, the arrival position recording operation is ended. On the other hand, when the determination is made that the hybrid electric vehicle 1 is parked in the off-road state, the determination is made by the arrival position detection unit 52 whether or not the link IDs of the roads respectively including the on-road position and off-road position are identical to each other (Step S14).

When the determination is made that the link IDs of the roads respectively including the on-road position and off-road position are identical to each other, the determination is made by the arrival position detection unit 52 whether or not the traveling direction of the hybrid electric vehicle 1 on the road before the off-road state is opposite to the traveling direction of the hybrid electric vehicle 1 on the road after the on-road state (Step S15).

When the determination is made that the traveling direction of the hybrid electric vehicle 1 on the road before the off-road state is not opposite to the traveling direction of the hybrid electric vehicle 1 on the road after the on-road state, the arrival position recording operation is ended. On the other hand, when the determination is made that the traveling direction of the hybrid electric vehicle 1 on the road before the off-road state is opposite to the traveling direction of the hybrid electric vehicle 1 on the road after the on-road state, the off-road position is recorded as a past arrived position (Step S16). In other words, the arrival position information having the link ID of the off-road position as an index thereof is stored in the arrival position information storage unit 54.

In the Step S14, when the determination is made that the link IDs of the roads respectively including the on-road position and off-road position are not identical to each other, the determination is made by the arrival position detection unit 52 whether or not the traveling range of the hybrid electric vehicle 1 in the off-road state is within the predetermined range (Step S17).

When the determination is made that the traveling range of the hybrid electric vehicle 1 in the off-road state is not within the predetermined range, the arrival position recording operation is ended. On the other hand, when the determination is made that the traveling range of the hybrid electric vehicle 1 in the off-road state is within the predetermined range, the off-road position is recorded as the past arrived position (Step S16).

As will be understood from the foregoing description, the vehicle navigation apparatus 30 according to the present embodiment is further designed to detect the off-road position as the past arrived position, under the conditions that the hybrid electric vehicle 1 is parked in the off-road state, and a traveling range of the hybrid electric vehicle 1 in the off-road state is within a predetermined range. The vehicle navigation apparatus 30 can therefore record in relation to the map information a space such as the parking space having an entrance and an exit different from each other.

Third Embodiment

The vehicle navigation apparatus according to the present embodiment is realized by changing the program executed by the CPU 31 of the vehicle navigation apparatus 30 according to the first or second embodiment of the present invention.

In the first or second embodiment of the present invention, the vehicle state control unit 56 is explained as controlling the engine ECU 8 via the interface circuit 40 to change the increased amount of the revolution speed and the delayed amount of the ignition timing of the engine 2 in the early warming up control in response to the arrival probability P calculated by the arrival probability calculation unit 55.

In contrast, the vehicle state control unit 56 is configured to control the air conditioner ECU 18 via the interface circuit 40 to change a preset temperature of the air conditioner 17 to decrease its power consumption of the air conditioner 17 in response to the current position being close to the past arrived position. Additionally, the vehicle state control unit 56 is further configured to change the preset temperature of the air conditioner 17 in response to the arrival probability P calculated by the arrival probability calculation unit 55.

More particularly, the vehicle state control unit 56 is configured to control the air conditioner ECU 18 so that the temperature inside the vehicle becomes a target temperature when the hybrid vehicle 1 arrives at the parking position and the IG 19 is turned off.

The term "target temperature" herein described is intended to indicate the temperature subtracted a predetermined temperature from the preset temperature of the air conditioner 17, the predetermined temperature being determined to the extent that a general user does not feel uncomfortable. The target temperature may be determined in response to a user setting temperature for the air conditioner 17 or the history of the user setting temperature, or may be determined in response to an outside air temperature.

Figure 13:
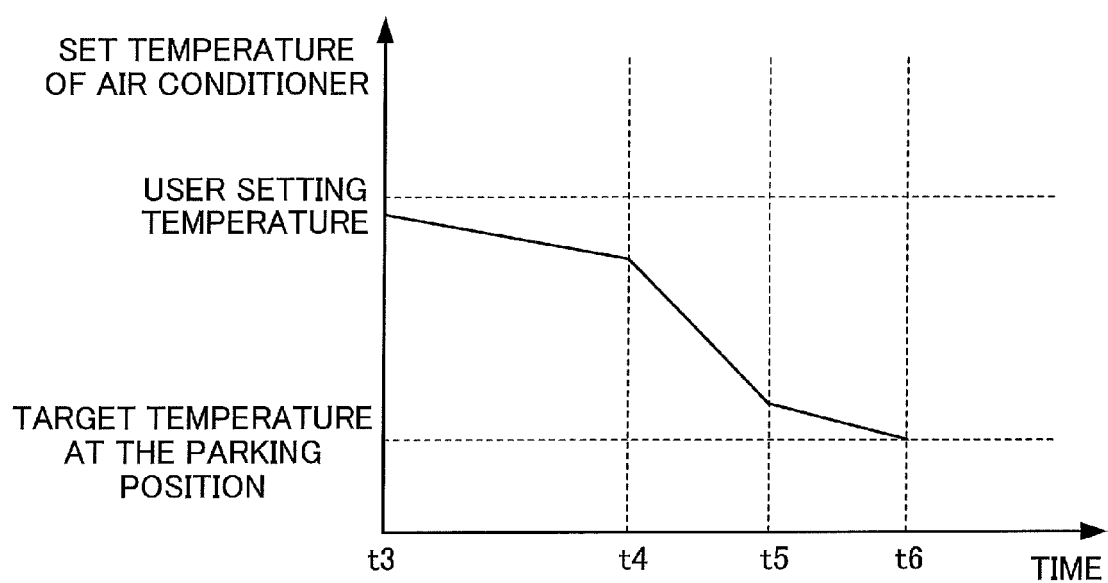
FIG. 13 is a graph showing an example of control amount for a preset temperature of an air conditioner by the vehicle state control unit constituting the vehicle navigation apparatus according to a third embodiment of the present invention.

For example, in case that the air conditioner 17 takes a heating mode, the current time is assumed to be t3, the predicted time at which the vehicle is predicted to arrive at the off-road position is assumed to be t4, the predicted time at which the vehicle is predicted to arrive at the parking position is assumed to be t5, and a predicted time at which the IG 19 is turned off is assumed to be t6, an expected temperature inside the vehicle at t3 is shown as FIG. 13.

The time period from the time t5 at which the vehicle is predicted to arrive at the parking position to the time t6 at which the IG 19 is turned off may be a time period indicated by a value learned by the vehicle state control unit 56 on the basis of past traveling history of the hybrid electric vehicle 1 and stored in the hard disk device 34. The time period may be included as a value represented by the arrival position information shown in FIG. 5.

If it is assumed that each target temperature at each time is Tpn and the user setting temperature is Tps, the vehicle state control unit 56 is configured to control the air conditioner ECU 18 to change the target temperature Tpn at each time according to a following formula on the basis of the arrival probability P calculated by the arrival probability calculation unit 55.

$$Tpn_{new}=(Tpn_{initial}-Tps)\times P+Tps$$

As will be understood from the foregoing description, the vehicle navigation apparatus 30 according to the present embodiment is designed to change the preset temperature of the air conditioner 17 in response to the arrival probability P of the hybrid electric vehicle 1 arriving at the past arrived position. The vehicle navigation apparatus 30 can therefore change the preset temperature of the air conditioner 17 with taking into account the case that the hybrid electric vehicle 1 does not arrive at the past arrived position, thereby improving drivability and fuel efficiency in a balanced manner.

Fourth Embodiment

The vehicle navigation apparatus according to the present embodiment is realized by changing the program executed by the CPU 31 of the vehicle navigation apparatus 30 according to any one of the first to third embodiments of the present invention and by changing the arrival position information stored in the arrival position information storage unit 54. The present embodiment is applicable to a hybrid electric vehicle or electric vehicle having a charge and discharge battery such as the battery 14.

In the first or second embodiment of the present invention, the vehicle state control unit 56 is explained as controlling the engine 2 via the interface circuit 40 to change the increased amount of the revolution speed and the delayed amount of the ignition timing of the engine 2 in the early warming up control in response to the arrival probability P calculated by the arrival probability calculation unit 55.

In contrast, in the present embodiment, the vehicle state control unit 56 is configured to control the motor ECU 15 via the interface circuit 40 to change the SOC of the battery 14 in response to the arrival probability P calculated by the arrival probability calculation unit 55.

Therefore, in the present embodiment, the arrival position information stored in the arrival position information storage unit 54 represents, with respect to each link ID, a changed amount of the SOC (hereinafter referred to as a "ΔSOC") of the battery 14 from the off-road position to the parking position, and the ΔSOC during parking, in addition to the travel distance from the node to the off-road position, the travel distance from the off-road position to the parking position, and the travel time from the off-road position to the parking position, as shown in FIG. 14.

It is assumed that a normal target SOC is SOCs, a predictive value of the ΔSOC from the current position to the off-road position is ΔSOCc, a predictive value of the ΔSOC from the off-road position to the parking position is ΔSOCi, and a predictive value of the ΔSOC during parking is ΔSOCp. The ΔSOCc is predetermined on the basis of the capacity of the battery 14 and others.

The vehicle state control unit 56 is configured to calculate the ΔSOCc on the basis of specification values of the hybrid electric vehicle 1, the map information, and others, and to obtain the ΔSOCi and ΔSOCp from the arrival position information stored in the arrival position information storage unit 54.

The vehicle state control unit 56 is configured to calculate the target SOCd when the IG 19 is turned off in the parking position according to a following formula.

$$SOCd=SOCs-(\Delta SOCc+\Delta SOCi+\Delta SOCp)$$

Figure 15:
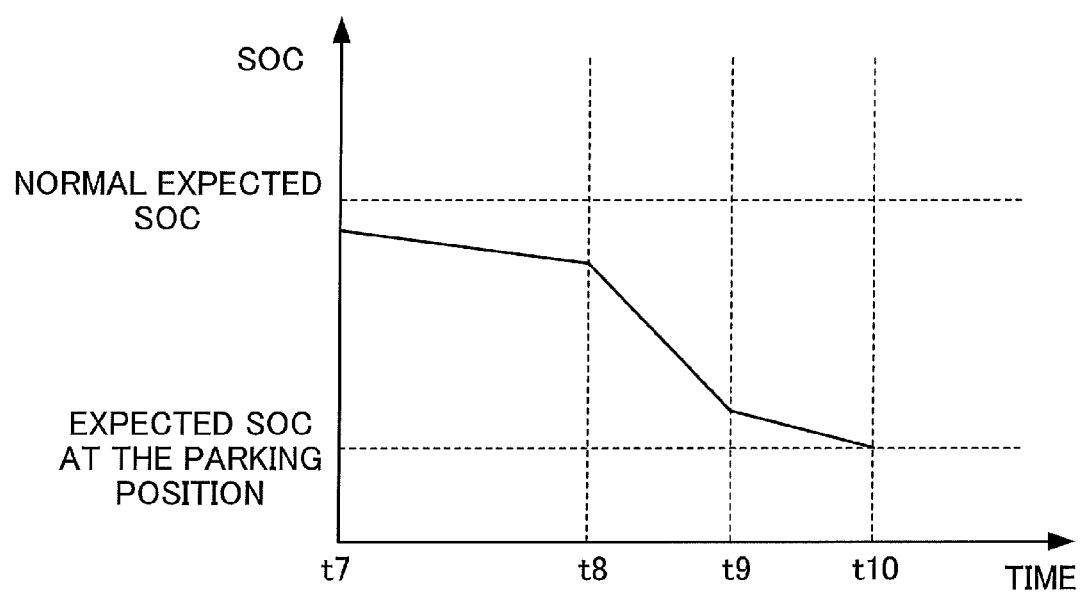
FIG. 15 is a graph showing an example of control amount for a remaining battery level by the vehicle state control unit constituting the vehicle navigation apparatus according to the fourth embodiment of the present invention.

If it is assumed that the current time is t7, the time at which the hybrid electric vehicle 1 is predicted to arrive at the off-road position is t8, the time at which the vehicle is predicted to arrive at the parking position is t9, and the time at which the IG 19 is predicted to be turned off is t10, the expected SOC of the battery 14 at the time t7 is represented as shown in FIG. 15.

The vehicle state control unit 56 is configured to control the motor ECU 15 to change the target SOCn at each time according to a following formula on the basis of the target SOCd at the parking position and the arrival probability P calculated by the arrival probability calculation unit 55.

$$SOCn=(SOCd-SOCs) \times P+SOCs$$

As will be understood from the foregoing description, the vehicle navigation apparatus 30 according to the present embodiment is designed to change the target value of the SOC of the battery 14 in response to the arrival probability P of the hybrid electric vehicle 1 arriving at the past arrived position. The vehicle navigation apparatus 30 can therefore set the SOC to the motor ECU 15 with taking into account the case that the hybrid electric vehicle 1 does not arrive at the past arrived position, thereby improving drivability and fuel efficiency in a balanced manner.

In the present embodiment, the vehicle state control unit 56 is explained to be configured to calculate the target SOCd when the IG 19 is turned off in the parking position according to a following formula.

$$SOCd=SOCs-(\Delta SOCc+\Delta SOCi+\Delta SOCp)$$

In the present invention, however, the vehicle state control unit 56 may be configured to calculate the target SOCd when the IG 19 is turned off in the parking position according to a following formula. In the following formula, it is assumed that an expected value of the ΔSOC during the warming up of the engine 2 is ΔSOCw, and an expected value of the ΔSOC from the parking position to the on-road position is ΔSOCo.

$$SOCd=SOCs-(\Delta SOCc+\Delta SOCi+\Delta SOCp+\Delta SOCw+\Delta SOCo)$$

In this case, the arrival position information stored in the arrival position information storage unit 54 is adapted to further represent, with respect to each link ID, the ΔSOC during the warming up and the ΔSOC from the parking position to the on-road position.

In the present invention, the vehicle state control unit 56 may be configured to calculate the target SOCd when the IG 19 is turned off at the parking position according to a following formula. In the following formula, it is assumed that an expected value of the ΔSOC from the time of hybrid electric vehicle 1 arriving at the parking position to the time of the IG 19 being turned off is ΔSOCe.

$$SOCd=SOCs-(\Delta SOCc+\Delta SOCi+\Delta SOCp+\Delta SOCw+\Delta SOCo+\Delta SOCe)$$

In this case, the ΔSOCe may be a value learned by the vehicle state control unit 56 on the basis of the past traveling history of the hybrid electric vehicle 1 and stored in the hard disk device 34, or may be a value further represented in the arrival position information with respect to each link ID.

In each embodiment of the present invention, there has been described about the case that the arrival position information stored in the arrival position information storage unit 54 represents a plurality of arrival positions as follows. While the IG 19 is ON, the arrival probability calculation unit 55 is configured to calculate the arrival probability P of the hybrid electric vehicle 1 arriving at each arrival position represented by the arrival position information, and the vehicle state control unit 56 is configured to calculate the control amounts in response to the respectively calculated arrival probabilities P, and to average the calculated control amounts to control the state of the hybrid electric vehicle 1 by the averaged control amount.

In contrast, in the present invention, when the arrival position information stored in the arrival position information storage unit 54 represents a plurality of arrival positions, while the arrival positions are within a predetermined distance from the current position, the arrival probability calculation unit 55 may be configured to calculate the arrival probability P of the hybrid electric vehicle 1 arriving at each arrival position within a predetermined distance from the current position, and the vehicle state control unit 56 may be configured to calculate the control amounts in response to the respectively calculated arrival probabilities P, and to average the calculated control amounts to control the state of the hybrid electric vehicle 1 by the averaged control amount.

In the present invention, the arrival probability calculation unit 55 may be configured to calculate the arrival probabilities P of the hybrid electric vehicle 1 arriving at a predetermined number of the arrival positions in order of being close to the current position among the arrival positions represented by the arrival position information, and the vehicle state control unit 56 may be configured to calculate the control amounts in response to the respective calculated arrival probabilities P, and to average the calculated control amounts to control the state of the hybrid electric vehicle 1 by the averaged control amount.

In the present invention, the arrival probability calculation unit 55 may be configured to calculate the arrival probability P of the hybrid electric vehicle 1 arriving at the arrival position nearest to the current position among the arrival positions represented by the arrival position information, and the vehicle state control unit 56 may be configured to control the state of the hybrid electric vehicle 1 by the control amount in response to the calculated arrival probability P.

In the present invention, the vehicle state control unit 56 may be configured to calculate the control amount in response to the highest arrival probability Pmax in the arrival probabilities P calculated for each arrival position represented by the arrival position information, and to control the state of the hybrid electric vehicle 1 by the calculated control amount.

The embodiments disclosed herein are merely exemplified in terms of all aspects, but the present invention is not limited to these embodiments. The scope of this invention is not limited to the explanation about the previously mentioned embodiments, but is defined in the claims to cover the equivalents to the elements or parts defined in the claims and all the modifications within the scope defined in the claims.

As has been explained in the above, the vehicle navigation apparatus according to the present invention has such an advantageous effect that the vehicle navigation apparatus can record the past arrived position in relation to the map information, even if the past arrived position is not represented by the map information. The vehicle navigation apparatus is therefore useful as the vehicle navigation apparatus for recoding past arrived positions.

REFERENCE SIGNS LIST

1 hybrid electric vehicle
2 engine
7 hybrid ECU
8 engine ECU
14 battery
15 motor ECU
16 battery ECU
17 air conditioner
18 air conditioner ECU
19 IG
21 shift position sensor
22 vehicle speed sensor
23 door sensor
30 vehicle navigation apparatus
31 CPU
32 RAM
33 ROM
34 hard disk device
35 display device
36 input device
37 speaker
38 GPS receiver
39 gyroscope
40 interface circuit
51 map information storage unit
52 arrival position detection unit
53 arrival position information recording unit
54 arrival position information storage unit
55 arrival probability calculation unit
56 vehicle state control unit

The invention claimed is:

1. A vehicle navigation apparatus that records past arrived positions, comprising:
   a map information storage unit that stores therein map information;
   an arrival position detection unit that detects an off-road position as the past arrived position, the off-road position being a position changed from an on-road state in which a current position of a vehicle is represented by the map information to an off-road state in which the current position of the vehicle is not represented by the map information; and
   an arrival position information recording unit that records arrival position information with regard to the past arrived position detected by the arrival position detection unit, in which:
   the arrival position detection unit is configured to detect the off-road position as the past arrived position under the conditions that:
   the vehicle is parked in the off-road state;
   an identifier in the map information of a road including a position changed from the on-road state to the off-road state is identical to an identifier in the map information of a road including a position changed from the off-road state to the on-road state; and
   a traveling direction of the vehicle on the road before the off-road state is opposite to a traveling direction of the vehicle on the road after the on-road state,
   the arrival position information includes at least the identifier in the map information of the road including the position changed from the on-road state to the off-road state, a travel distance to the off-road position on the road, and a travel distance from the off-road position to a parking position at which the vehicle is parked,
   the vehicle navigation apparatus further comprises an arrival probability calculation unit that calculates an arrival probability of the vehicle arriving at the past arrived position from the current position on the basis of the arrival position information, and
   in the on-road state, the arrival probability calculation unit is configured to calculate the arrival probability by a product of:
   a ratio of the number of having changed to the off-road state from the off-road position to the number of past traveling on the road corresponding to the current position of the vehicle;
   a probability factor decreasing in response to increasing distance from the current position of the vehicle to a parked position; and
   a probability factor increasing in response to the increasing number of past traveling on the road corresponding to the current position of the vehicle.

2. The vehicle navigation apparatus as set forth in claim 1, in which the arrival position detection unit is configured to detect the off-road position as the past arrived position under the conditions that:
   the vehicle is parked in the off-road state;
   the identifier in the map information of the road including the position changed from the on-road state to the off-road state is not identical to the identifier in the map information of the road including the position changed from the off-road state to the on-road state; and
   a traveling range of the vehicle in the off-road state is within a predetermined range.

3. The vehicle navigation apparatus as set forth in claim 1, in which, in the off-road state, the arrival probability calculation unit is configured to calculate the arrival probability by a product of:
   a probability factor decreasing in response to increasing distance from the current position of the vehicle to the parked position; and
   a probability factor determined in response to driving operations of the vehicle.

4. The vehicle navigation apparatus as set forth in claim 3, further comprising a vehicle state control unit that controls a state of the vehicle, wherein
   the vehicle state control unit is configured to change a control amount of the state of the vehicle in response to the arrival probability calculated by the arrival probability calculation unit.

5. The vehicle navigation apparatus as set forth in claim 1, further comprising a vehicle state control unit that controls a state of the vehicle, wherein the vehicle state control unit is configured to change a control amount of the state of the vehicle in response to the arrival probability calculated by the arrival probability calculation unit.

6. The vehicle navigation apparatus as set forth in claim 5, in which the vehicle state control unit is configured to change a control amount of early warming up control for an internal combustion engine of the vehicle in response to the arrival probability calculated by the arrival probability calculation unit.

7. The vehicle navigation apparatus as set forth in claim 5, in which the vehicle state control unit is configured to change a preset temperature of an air conditioner to decrease its power consumption in response to the current position of the vehicle being close to the past arrived position, and further configured to change the preset temperature in response to the arrival probability calculated by the arrival probability calculation unit.

8. The vehicle navigation apparatus as set forth in claim 5, in which the vehicle state control unit is configured to change a remaining battery level of the vehicle in response to the arrival probability calculated by the arrival probability calculation unit.

\* \* \* \* \*